United States Patent

Sakamaki et al.

Patent Number: 5,457,350
Date of Patent: Oct. 10, 1995

[54] LAMINATED CORE OF ROTATING ELECTRIC MACHINE

[75] Inventors: Hirotaka Sakamaki; Masayuki Ishikawa; Hidetoshi Shimada; Shizunori Mitsuma; Hiroshi Zenisawa; Kiyoshi Nagashima; Noboru Takarasawa, all of Nagano, Japan

[73] Assignee: Kabushiki Kaisha Sankyo Seiki Seisakusho, Nagano, Japan

[21] Appl. No.: 97,893

[22] Filed: Jul. 28, 1993

[30] Foreign Application Priority Data

Jul. 29, 1992 [JP] Japan ..................... 4-222139

[51] Int. Cl.$^6$ ............................ H02K 1/06
[52] U.S. Cl. .................. 310/216; 310/42; 310/259; 310/261; 310/269
[58] Field of Search .............. 310/216, 42, 217, 310/218, 45, 269, 254, 259, 261, 262, 44, 67 R; 29/596, 605, 609

[56] References Cited

U.S. PATENT DOCUMENTS

| | | | |
|---|---|---|---|
| 3,202,851 | 8/1965 | Zimmerle | 310/261 |
| 4,053,801 | 10/1977 | Ray | 310/216 |
| 4,102,040 | 7/1978 | Rich | 310/42 |
| 4,514,654 | 4/1985 | Muller | 310/216 |
| 4,761,576 | 8/1988 | Savage | 310/216 |
| 4,910,420 | 3/1990 | Hoover | 310/42 |
| 5,208,503 | 5/1993 | Hisey | 310/259 |

FOREIGN PATENT DOCUMENTS 23048  1/1990  Japan .

Primary Examiner—R. Skudy
Attorney, Agent, or Firm—Sughrue, Mion, Zinn, Macpeak & Seas

[57] ABSTRACT

A laminated core for a rotating electric machine comprising a plurality of single sheet cores, each single-sheet core being formed by arranging a plurality of salient poles continuously on a beltlike yoke plate and winding the beltlike yoke plate so as to be cylindrical while joining both ends of the beltlike yoke plate, wherein the laminated core is cylindrical and has a plurality of salient poles confronting a magnet, each salient pole having a winding and the laminated core is formed by laminating a plurality of the single-sheet cores.

5 Claims, 3 Drawing Sheets

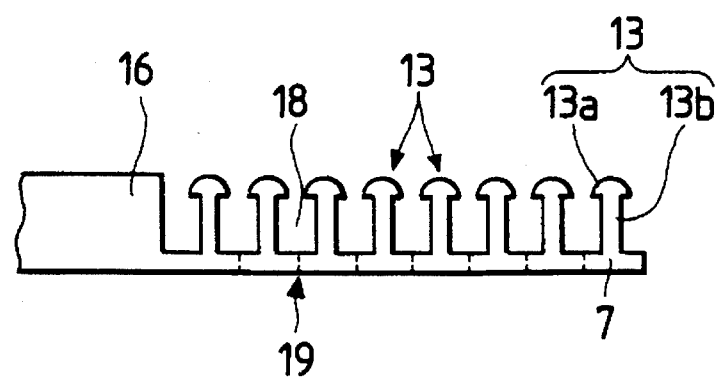
FIG. 4
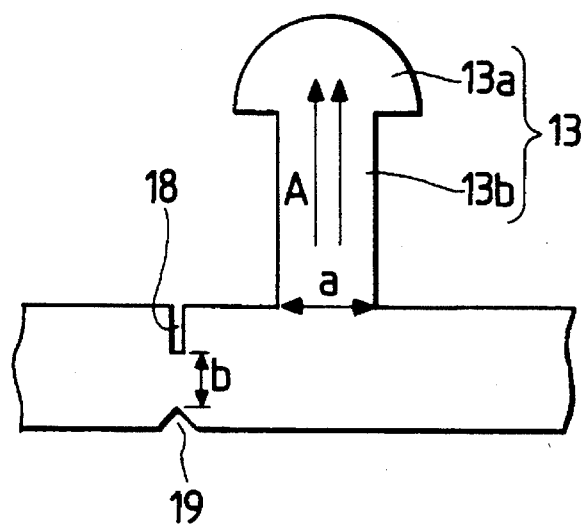
FIG. 5
FIG. 6  PRIOR ART
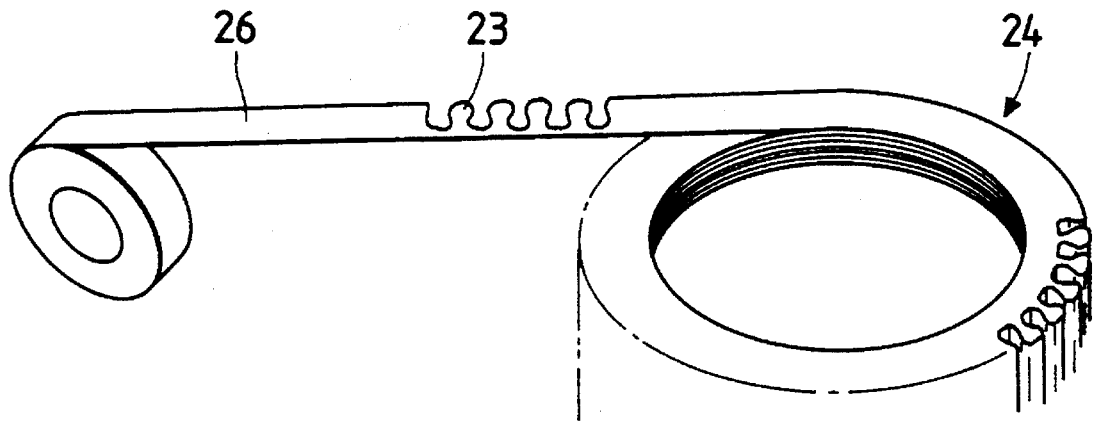

5,457,350

LAMINATED CORE OF ROTATING ELECTRIC MACHINE

BACKGROUND OF THE INVENTION

1. Field of the Invention

The invention relates to laminated cores for rotating electric machines.

2. Related Art

As shown in FIG. 10, among rotating electric machines are brushless motors 40 used as sources for driving electric products such as video tape recorders and floppy disk drives.

The brushless motor 40 is of such a type that a magnet is rotated. Such a brushless motor includes a rotor section having a rotor magnet 34, a stator section having a stator core 24 with windings 28, and a drive circuit in the form of a circuit board 31 for controlling current to be applied to the windings 28 of the stator core 24.

As shown in FIG. 10, the stator core section of this brushless motor 40 includes: a core winding assembly 29 having the stator core 24 and the windings 28, . . . , 28 wound around salient poles 23, . . . , 23; a core holder 30, made of an electrically insulating resin, for supporting the stator core 24 so that the stator core 24 can be placed on the circuit board 31 while electrically insulated; and a lead 36 relaying electric connection between the winding 28 of each phase fixed on the core holder 30 and the drive circuit on the circuit board 31. The rotor section includes: a ringlike rotor magnet 34; a rotor case 27 for securing the rotor magnet 34; and a rotating shaft 35 for supporting the rotor case 27 firmly. The rotor section and the stator section are assembled so that the rotor magnet 34 comes outside the stator core 24 and forms a gap relative to the outer circumference of the salient poles 23. The rotating shaft 35 of the rotor section is rotatably supported by a bearing holder 32 that is fixed on the stator core 24. The bearing holder 32 is inserted from the top of the stator core 24 so as to pass through a central through hole 24a of the stator core 24 and a central through hole 30a of the core holder 30 as well as a through hole 31a of the circuit board 31. The bearing holder 32 is fixed on the circuit board 31 with machine screws 33 integrally with the stator core 24 with a flange portion 32a at the base of the bearing holder fitted with a stepped portion 24b of the stator core 24.

A conventional example of the laminated core 24 as a stator core used for a rotating electric machine (a brushless motor) is disclosed in Japanese Patent Unexamined Publication No. 23048/1990. As shown in FIG. 6, this laminated core is made of a magnetic material and is formed by arranging salient poles 23 continuously on one side along the length of a beltlike plate member 26 and spirally winding the plate member 26 so as to involute or revolute.

Since such conventional laminated core 24 is formed by spirally winding the beltlike plate member 26, a difference in level equal to the thickness of the beltlike plate member 26 is produced on each of the upper and lower surfaces of the laminated core 24 as shown in FIG. 7. Such differences in level increase the constitution of the laminated core 24, making it difficult to flatten the motor. Further, since one magnetic center M1 of the laminated core 24 and the other magnetic center M2 thereof do not coincide with each other, vibration, rotational variations, and the like are caused when such laminated core 24 is used. Still further, the presence of the difference in level on the upper surface of the laminated core 24 does not keep the size of a winding space between the upper surface of the laminated core 24 and the rotor case 27 consistent, i.e., small at a left portion designated by reference numeral 25 and large at a right portion designated by reference numeral 25', both as viewed in FIG. 7. Thus, the winding had to be made in such a manner as to fit the smaller winding space 25.

Further, in the conventional example, when a grain oriented silicon steel strip is used as a material of the beltlike plate member 26, the salient poles 23 of the laminated core 24 are designed to project in a direction orthogonal to the rolling direction A of the grain oriented silicon steel strip, thereby reducing the force of converging the magnetic flux M. In other words, the grain oriented silicon steel strip is easy to magnetize in the same direction as the rolling direction A (the magnetic flux is easy to pass through in such direction).

SUMMARY OF THE INVENTION

The invention has been made to overcome these problems. Accordingly, the object of the invention is to provide an inexpensive laminated core for a rotating electric machine which is capable of converging magnetic flux at a high rate and providing a winding space effectively with no difference in level produced over the entire circumference thereof.

According to an aspect of the present invention, there is provided a laminated core for a rotating electric machine comprising: a plurality of single sheet cores, each single-sheet core being formed by arranging a plurality of salient poles continuously on a beltlike yoke plate and winding the beltlike yoke plate so as to be cylindrical while joining both ends of the beltlike yoke plate, wherein the laminated core is cylindrical and has a plurality of salient poles confronting a magnet, each salient pole having a winding and the laminated core is formed by laminating a plurality of the single-sheet cores.

According to the present invention, the laminated core of a rotating electric machine is formed by laminating a plurality of single-sheet cores, each of the single-sheet cores being formed by winding the yoke plate so as to be cylindrical, the yoke plate having the continuously formed salient poles along the length thereof. As a result, the laminated core is free from differences in level, which allows the magnetic centers of the laminated core to be uniform over the entire circumference thereof. Consequently, not only vibration and rotational variations of the motor can be reduced, but also only a predetermined space is required for winding, thus contributing to saving the winding space.

According to the present invention, the yoke plate of the laminated core for a rotating electric machine is formed in such a manner that the salient poles project in the direction of rolling the rolled silicon steel strip. As a result, the magnetic flux can be converged easily, thereby allowing motor characteristics to be improved.

BRIEF DESCRIPTION OF THE DRAWINGS

FIG. 4 is a plan view showing another exemplary process of manufacturing the laminated core for the rotating electric machine of the invention;

FIG. 5 is an enlarged plan view showing a main portion of an exemplary single-sheet core applicable to the invention;

FIG. 6 is a perspective view showing an exemplary method of manufacturing a conventional laminated core for a rotating electric machine;

DETAILED DESCRIPTION OF THE PREFERRED EMBODIMENTS

Figure 1:
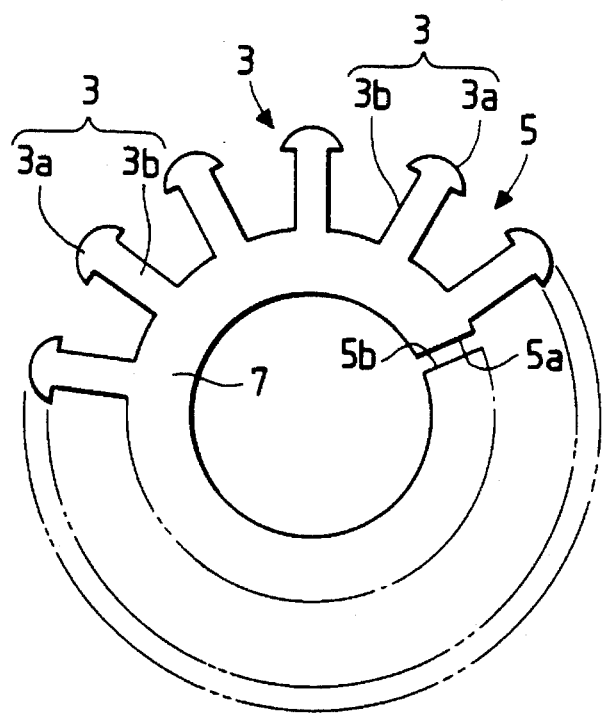
FIG. 1 is a plan view showing an exemplary single-sheet core applicable to the invention.

Armature cores for rotating electric machines, which are embodiments of the invention, will now be described with reference to the drawings. In FIG. 1, a cylindrical core 5 constituting a laminated core is formed on a single-sheet basis and has a plurality of salient poles 3 on the outer circumference thereof. A ring portion 7 is formed in the middle of the core 5. Each salient pole 3 includes an umbrella portion 3a and a rib portion 3b. A front end of the umbrella portion 3a extends arcuately, and the width of the rib portion 3b interposed between the umbrella portion 3a and the ring portion 7 is narrower than the width of the umbrella portion 3a. A winding 2 is applied for a predetermined numbers of turns on the rib portion 3b of each salient pole 3. An insulating layer (not shown) is formed so that the surface of each salient pole 3 (particularly, the surface of the rib porion 3b to which the winding 2 is applied) and the winding 2 can be insulated for the purpose of preventing a motor from not functioning (e.g., not being driven) due to shortcircuiting between the windings 2 through the laminated core 4.

Figure 2:
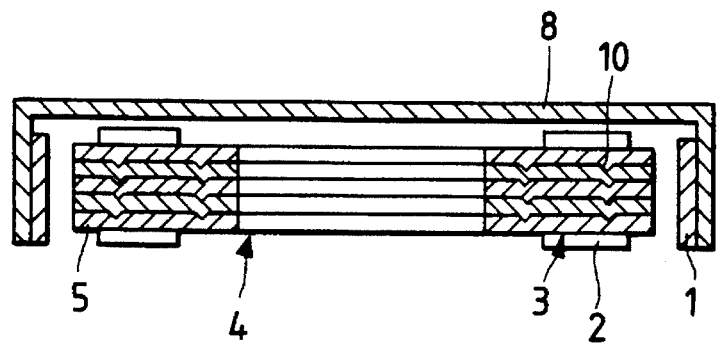
FIG. 2 is a sectional view showing a laminated core for a rotating electric machine, which is an embodiment of the invention.

The laminated core 4 such as shown in FIG. 2 is formed by half-blanking relatively large areas (the base portions of the salient poles 3, the umbrella portions 3a of the salient poles 3, and the like) of the single-sheet core 5, and combining the recessed portions and the projected portions formed by half-blanking the plurality of single-sheet cores 5 together and subjecting the combined single-sheet cores 5 to lamination caulking. The winding 2 is applied to each salient pole 3 arranged on the outer circumference of the laminated core 4. The laminated core 4 is covered by a bottomed cylindrical rotor case 8. On an inner circumferential wall of such a rotor case 8 is a cylindrical magnet 1, which confronts an outer circumferential surface of each salient pole of the laminated core 4 while interposing a gap therebetween. Reference numeral 10 in FIG. 2 designates the half-blanked portion for integrally caulking the plurality of laminated single-sheet cores.

Figure 3:
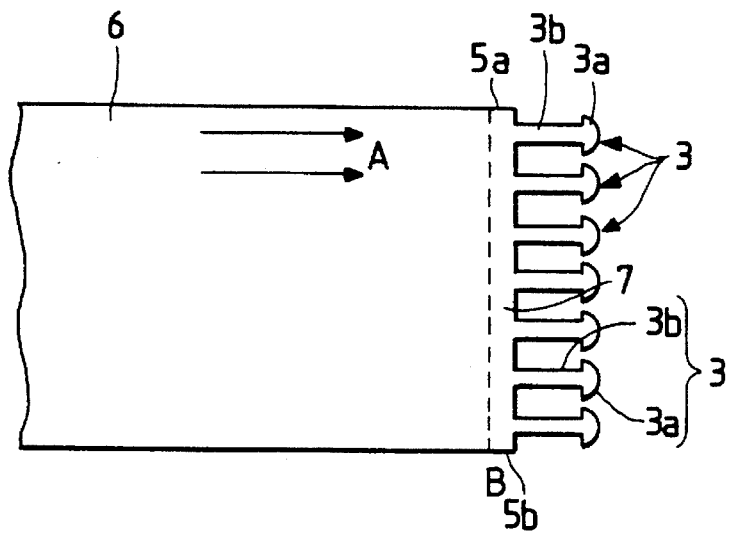
FIG. 3 is a plan view showing an exemplary process of manufacturing the laminated core for the rotating electric machine of the invention.
Figure 7:
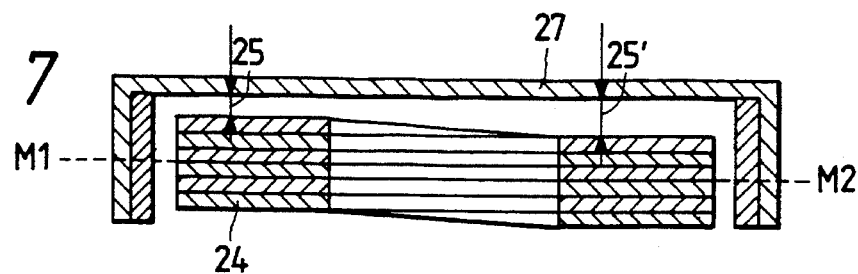
FIG. 7 is a sectional view showing an exemplary laminated core for a rotating electric machine.
Figure 8:
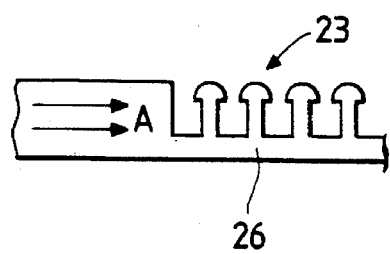
FIG. 8 is a sectional view showing a process of manufacturing the laminated core for the rotating electric machine.
Figure 9:
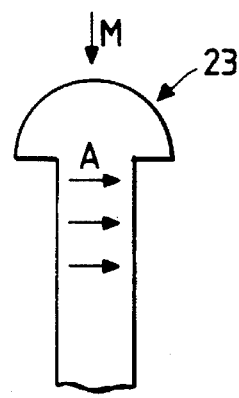
FIG. 9 is an enlarged plan view showing a main portion of the exemplary laminated core for the rotating electric machine.
Figure 10:
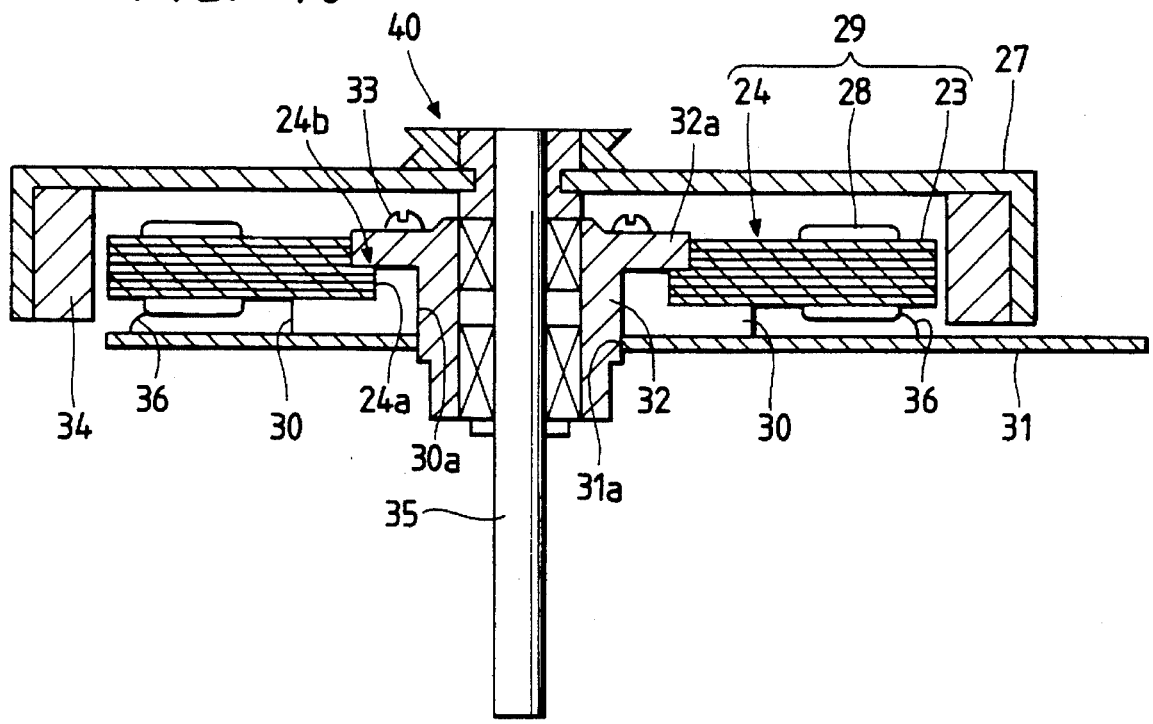
FIG. 10 is a sectional view showing a blushless motor containing a conventional laminated core.

An exemplary method of manufacturing such a laminated core 4 as the embodiment will be described next. In FIG. 3, a plurality of salient poles 3 are formed by press working on an end edge portion of a yoke plate 6 made of a beltlike grain oriented silicon steel strip rolled in the direction of arrows A, the salient poles 3 projecting in the same direction as the rolling direction A. After or at the same time the salient poles 3 have been formed, a portion of the yoke plate 6 which is indicated by a dotted line B positioned slightly inward from the position at which the salient poles 3 are formed is cut by a press or the like. Then the cut edges are curled so that a cylindrical single-sheet core 5 can be formed with the salient poles 3 arranged on the outer side. The cylindrical single-sheet core 5 is formed by, e.g., causing an end 5a of the beltlike yoke plate 6 to abut against the other end 5b. When both ends 5a, 5b abut against each other, it is not necessary to fix these ends 5a, 5b by bonding or the like, because these ends 5a, 5b are subjected to lamination caulking as will be described later.

The cylindrical single-sheet core 5 may be formed by securing the end 5a and the other end 5b by some means.

The single-sheet core 5 is subjected to half blanking such as shown by reference numeral 10 in FIG. 2 on relatively large portions such as on the umbrella portions 3a or the like of the respective salient poles 3, so that the recessed portions and the projected portions are formed on the front surface as one surface of the single-sheet core 5 and on the rear surface as the other surface of the single-sheet core 5, respectively. The recessed and projected portions of a plurality of laminated single-sheet cores 5 that have been subjected to half blanking are fitted into one another so as to form the laminated core 4 by lamination caulking. In order to laminate the single-sheet cores 5, it is preferable to laminate while staggering the interfaces of the single-sheet cores 5 so that the interfaces of the single-sheet cores 5 extend linearly over a plurality of laminated single-sheet cores 5. The above is how the laminated core 4 is manufactured.

Since the laminated core 4 is formed by laminating single-sheet cores 5 prepared sheet by sheet, it is not likely that differences in level will be produced on the laminated core 4 as is with the case of the conventional fabrication in which a single sheet core is laminated by spirally winding. That is, the advantage obtained by the fabrication method of the invention is that the magnetic centers are uniform over the entire circumference of the laminated core 4. Therefore, when such laminated core 4 is applied to a motor, a motor exhibiting less rotational variations, less vibration, or the like can be obtained. Similarly, the absence of differences in level in the laminated core 4 allows consistent winding spaces to be provided for the respective salient poles 3, which can save the winding space. Further, the use of a grain oriented silicon steel strip as the yoke plate 6 facilitates convergence of magnetic flux, thereby improving motor characteristics and facilitating the fabrication of various sizes of salient poles 3 because the salient poles 3 are formed with molds. While the grain oriented silicon steel strip has been used as the yoke plate 6, materials of the yoke plate 6 are not limited thereto, but may be non-grain oriented silicon steel strip or other materials.

Another exemplary method of manufacturing the laminated core 4 will be described. As shown in FIG. 4, using a nonoriented silicon steel strip as a beltlike yoke plate 16, a plurality of salient poles 13 are formed on a single side along the length of the yoke plate 16 by press molding. After the salient poles 13 have been formed, the yoke plate is cut at a predetermined number of salient poles and the cut end is curled so that the salient poles 13 come on the outer side. A plurality of the thus formed single-sheet core 5 are laminated in a manner similar to the above-described embodiment and subjected to lamination caulking to be formed into a laminated core 4. In a manner similar to the previously described embodiment, it is preferable to laminate by staggering the interfaces of the single-sheet cores 5. Since the laminated core is formed by laminating a plurality of single-sheet cores 5, the same advantage as described with reference to the previously described embodiment can be obtained. In addition, since the salient poles 13 are formed on one side along the length of the beltlike yoke plate 16, it is possible to arbitrarily select the number of salient poles 13 formed on a single sheet core 5, thereby allowing the single-sheet core to be formed in various sizes. Each salient pole 13 has an umbrella portion 13a and a rib portion 13b as in the previously described embodiment.

While curling is provided so that the salient poles come on the outer side after having formed the salient poles on the silicon steel strip and having cut the silicon steel strip in either embodiment, the application of the invention is not limited thereto, but may be such that curling is provided so that the salient poles come on the inner side. Further, as shown in FIG. 5, to facilitate the curling of the member prepared by forming the salient poles on the yoke and cutting the thus worked yoke plate, slits 18 and V-shaped indentations 19 may be formed. The slits 18 are arranged between the salient poles of the yoke plate and the V-shaped indentations 19 are formed so as to confront the slits 18 at positions which are on the side opposite to the side on which the salient poles are formed. Curling may be made so that the slits 18 come on the outer circumferential side of the single-sheet core and that the V-shaped indentations 19 come on the inner circumferential side thereof. Therefore, the width of each slit 18 may be very narrow, whereas the angle of opening of the V-shaped indentation 19 may be such as to correspond to the inner diameter of the curling made on the single-sheet core. In this case, the magnetic flux converged at each salient pole is transmitted while bifurcated to both right and left at the base of the salient pole. Therefore, the distance b between the depth of the slit 18 and that of the V-shaped indentation 19 is desirably set to a value one-half or more the width a of the salient pole.

The invention is provided as forming the laminated core of a rotating electric machine by laminating a plurality of single-sheet cores, each of the single-sheet cores being formed by winding the yoke plate so as to be cylindrical, the yoke plate having the continuously formed salient poles along the length thereof. As a result, the laminated core is free from differences in level, which allows the magnetic centers of the laminated core to be uniform over the entire circumference thereof. Consequently, not only vibration and rotational variations of the motor can be reduced, but also only a predetermined space is required for winding, thus contributing to saving the winding space.

The invention is also provided as forming the yoke plate of the laminated core for a rotating electric machine so that the salient poles project in the direction of rolling the rolled silicon steel strip. As a result, the magnetic flux can be converged easily, thereby allowing motor characteristics to be improved.

What is claimed is:

1. A laminated core for a rotating electric machine, comprising:

a plurality of single sheet cores, each single-sheet core being formed by arranging a plurality of salient poles continuously on a belt-like yoke plate and winding the belt-like yoke plate so as to be cylindrical while joining both ends of the belt-like yoke plate, wherein the laminated core is cylindrical and has a plurality of salient poles confronting a magnet, each salient pole having a width and a winding, and the laminated core is formed by laminating a plurality of the single-sheet cores, wherein the yoke plate is made of a grain oriented silicon steel strip, and is formed so that the salient poles project in a direction of rolling a rolled grain oriented silicon steel strip, and wherein the yoke plate includes a plurality of slits, with a corresponding slit being disposed between adjacent salient poles, each slit having a depth defining an open end and a closed end such that a distance between the closed end and an opposite edge of the yoke plate is greater than or equal to ½ the width of a corresponding salient pole.

2. A laminated core for a rotating electric machine according to claim 1, wherein a plurality of single-sheet cores are formed by lamination press fitting.

3. A laminated core for a rotating electric machine according to claim 1, wherein the laminated core is formed by forming recessed portions on one surface of each single-sheet core and projected portions on an other surface thereof and by fitting the recessed portions and the projected portions formed on both surfaces with one another by lamination press fitting.

4. A laminated core for a rotating electric machine according to claim 1, wherein the laminated core is formed by staggering interfaces of the single-sheet cores, each single-sheet core being formed while joining both ends of the beltlike yoke plate having a plurality of salient poles continuously formed thereon and while winding such beltlike yoke plate so as to be cylindrical.

5. A laminated core for a rotating electric machine according to claim 1, wherein the yoke plate further includes V-shaped identations disposed on the opposite edge thereof so as to respectively confront the slits.

* * * * *